US012328168B2

(12) United States Patent
Manolakos et al.

(10) Patent No.: US 12,328,168 B2
(45) Date of Patent: Jun. 10, 2025

(54) FREQUENCY DOMAIN CORRELATION FEEDBACK FOR ENHANCED FREQUENCY DOMAIN PARTIAL RECIPROCITY DOWNLINK

(71) Applicant: QUALCOMM Incorporated, San Diego, CA (US)

(72) Inventors: Alexandros Manolakos, Escondido, CA (US); Pavan Kumar Vitthaladevuni, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 17/755,580

(22) PCT Filed: Oct. 22, 2020

(86) PCT No.: PCT/US2020/070685
§ 371 (c)(1),
(2) Date: May 2, 2022

(87) PCT Pub. No.: WO2021/102454
PCT Pub. Date: May 27, 2021

(65) Prior Publication Data
US 2022/0352948 A1    Nov. 3, 2022

(30) Foreign Application Priority Data

Nov. 18, 2019    (GR) .............................. 20190100524

(51) Int. Cl.
*H04B 7/06*    (2006.01)
*H04L 5/00*    (2006.01)
(Continued)

(52) U.S. Cl.
CPC ........... *H04B 7/0626* (2013.01); *H04L 5/001* (2013.01); *H04L 5/0048* (2013.01);
(Continued)

(58) Field of Classification Search
CPC ................ H04B 7/0626; H04W 72/21; H04W 72/0453; H04L 5/001; H04L 5/0048; H04L 5/0051; H04L 5/0057
See application file for complete search history.

(56) References Cited

U.S. PATENT DOCUMENTS

| 6,662,024 B2 | 12/2003 | Walton et al. |
| 10,263,745 B2 | 4/2019 | Soriaga et al. |

(Continued)

FOREIGN PATENT DOCUMENTS

| CN | 109417404 A | 3/2019 |
| WO | WO-2002093819 | 11/2002 |

(Continued)

OTHER PUBLICATIONS

International Search Report and Written Opinion—PCT/US2020/070685—ISA/EPO—Jan. 28, 2021.

(Continued)

*Primary Examiner* — Chandrahas B Patel
(74) *Attorney, Agent, or Firm* — Paul M. McAdams; Harrity & Harrity, LLP

(57) ABSTRACT

Various aspects of the present disclosure generally relate to wireless communication. In some aspects, a user equipment (UE) may transmit a sounding reference signal (SRS) on a first set of sub-bands (305). The UE may report channel state information (CSI) associated with a second set of sub-bands (310). The first set of sub-bands may be different from the second set of sub-bands. The CSI may include information that identifies one or more frequency domain correlations (Continued)

among the first set of sub-bands and the second set of sub-bands. Numerous other aspects are described.

55 Claims, 10 Drawing Sheets

(51) Int. Cl.
*H04W 72/0453* (2023.01)
*H04W 72/21* (2023.01)

(52) U.S. Cl.
CPC .......... *H04L 5/0051* (2013.01); *H04L 5/0057* (2013.01); *H04W 72/0453* (2013.01); *H04W 72/21* (2023.01)

(56) References Cited

U.S. PATENT DOCUMENTS

| | | | | |
|---|---|---|---|---|
| 10,375,734 B2* | 8/2019 | Suzuki | ................... | H04J 13/22 |
| 10,674,509 B2 | 6/2020 | Bhattad et al. | | |
| 11,445,484 B2* | 9/2022 | Qin | ....................... | H04W 72/21 |
| 11,469,806 B2* | 10/2022 | Talarico | .................. | H04L 5/001 |
| 11,770,206 B2* | 9/2023 | Mukherjee | ............ | H04L 5/0048 |
| | | | | 370/329 |
| 12,016,005 B2* | 6/2024 | Tomeba | ................ | H04B 7/0695 |
| 2016/0269159 A1* | 9/2016 | Soriaga | ............... | H04L 25/0398 |
| 2018/0278316 A1 | 9/2018 | Yang et al. | | |
| 2019/0281487 A1 | 9/2019 | Liu et al. | | |
| 2019/0335385 A1 | 10/2019 | Zhang et al. | | |
| 2021/0315012 A1* | 10/2021 | Yoon | ................... | H04W 74/008 |

FOREIGN PATENT DOCUMENTS

| | | |
|---|---|---|
| WO | 2016148794 | 9/2016 |
| WO | 2016148797 | 9/2016 |
| WO | 2016148797 A1 | 9/2016 |
| WO | 2018140247 | 8/2018 |
| WO | 2018171803 A1 | 9/2018 |
| WO | 2019071383 A1 | 4/2019 |

OTHER PUBLICATIONS

Taiwan Search Report—TW109136861—TIPO—May 7, 2024.
Taiwan Search Report—TW109136861—TIPO—Sep. 20. 2024.

* cited by examiner

FREQUENCY DOMAIN CORRELATION FEEDBACK FOR ENHANCED FREQUENCY DOMAIN PARTIAL RECIPROCITY DOWNLINK

CROSS-REFERENCE TO RELATED APPLICATIONS APPLICATION

This Patent Application is a 371 national stage of PCT Application No. PCT/US2020/070685 filed on Oct. 22, 2020, entitled "FREQUENCY DOMAIN CORRELATION FEEDBACK FOR ENHANCED FREQUENCY DOMAIN PARTIAL RECIPROCITY DOWNLINK," which claims priority to Greece Patent Application No. 20190100524, filed on Nov. 18, 2019, entitled "FREQUENCY DOMAIN CORRELATION FEEDBACK FOR ENHANCED FREQUENCY DOMAIN PARTIAL RECIPROCITY DOWNLINK," and assigned to the assignee hereof. The disclosure of the prior Applications are considered part of and are incorporated by reference into this Patent Application.

FIELD OF THE DISCLOSURE

Aspects of the present disclosure generally relate to wireless communication and to techniques and apparatuses for frequency domain correlation feedback for enhanced frequency domain partial reciprocity downlink.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include transmitting a sounding reference signal (SRS) on a first set of sub-bands; and reporting channel state information (CSI) associated with a second set of sub-bands, wherein the first set of sub-bands is different from the second set of sub-bands, and wherein the CSI includes information that identifies one or more frequency domain correlations among the first set of sub-bands and the second set of sub-bands.

In some aspects, a UE for wireless communication may include memory and one or more processors operatively coupled to the memory. The memory and the one or more processors may be configured to transmit an SRS on a first set of sub-bands; and report CSI associated with a second set of sub-bands, wherein the first set of sub-bands is different from the second set of sub-bands, and wherein the CSI includes information that identifies one or more frequency domain correlations among the first set of sub-bands and the second set of sub-bands.

In some aspects, a non-transitory computer-readable medium may store one or more instructions for wireless communication. The one or more instructions, when executed by one or more processors of a UE, may cause the one or more processors to: transmit an SRS on a first set of sub-bands; and report CSI associated with a second set of sub-bands, wherein the first set of sub-bands is different from the second set of sub-bands, and wherein the CSI includes information that identifies one or more frequency domain correlations among the first set of sub-bands and the second set of sub-bands.

In some aspects, an apparatus for wireless communication may include means for transmitting an SRS on a first set of sub-bands; and means for reporting CSI associated with a second set of sub-bands, wherein the first set of sub-bands is different from the second set of sub-bands, and wherein the CSI includes information that identifies one or more frequency domain correlations among the first set of sub-bands and the second set of sub-bands.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
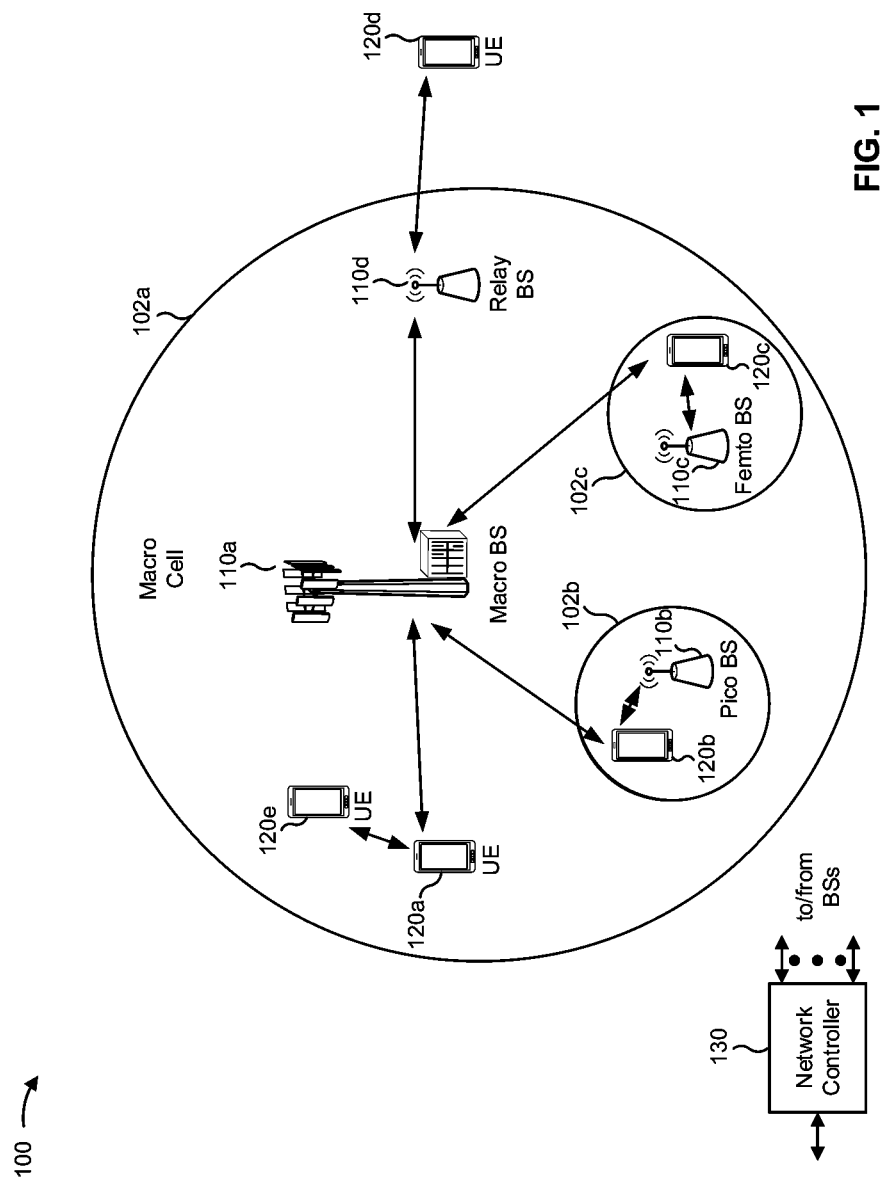
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
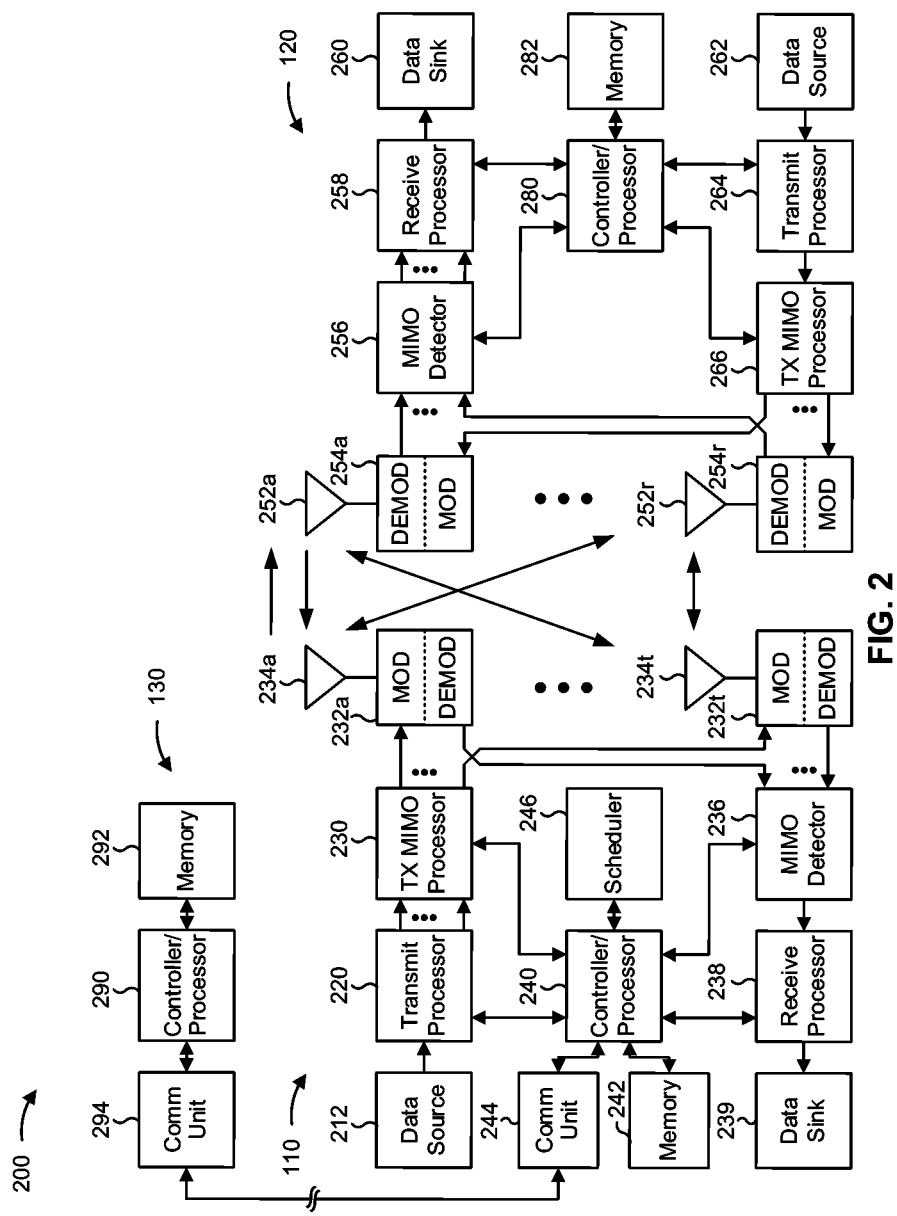
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with frequency domain correlation feedback for enhanced frequency domain partial reciprocity downlink, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4 and/or other processes as described herein. A scheduler 246 may schedule UEs for data transmission on the downlink and/or uplink.

In some aspects, UE 120 may include means for transmitting an SRS on a first set of sub-bands; means for reporting CSI associated with a second set of sub-bands, wherein the first set of sub-bands is different from the second set of sub-bands, and wherein the CSI includes information that identifies one or more frequency domain correlations among the first set of sub-bands and the second set of sub-bands; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In a wireless communication system may utilize time division duplexing (TDD), meaning that downlink and uplink transmissions share the same frequency band. When a UE is capable of and permitted to sound (i.e., transmit a sounding reference signal (SRS)) on all component carriers in the frequency band of the TDD system, full reciprocity in the frequency domain is enabled. However, in some TDD systems, a UE may not be capable of transmitting (or may not be permitted to transmit) SRS on all component carriers in the frequency band, meaning that only partial reciprocity exists in the frequency domain. Notably, channel estimates on closely spaced component carriers may be correlated. Therefore, an SRS on one component carrier may be useful for determining a downlink beamforming precoding vector (e.g., $W_1$) on an adjacent component carrier for channel state information (CSI) (e.g., Type II CSI). Full reciprocity inherently does not exist in a wireless communication system that uses frequency division duplexing (FDD) (e.g., since downlink transmissions and uplink transmission utilize different frequency bands). Thus, similar to the TDD scenario above, an SRS based precoding vector may be useful as a downlink beamforming precoding vector for downlink CSI in an FDD system.

In some cases of partial reciprocity in the frequency domain, an SRS may be associated with a particular frequency range (e.g., a bandwidth, a bandwidth part, a component carrier, a frequency band, and/or the like) for the purpose of performing downlink CSI acquisition using partial frequency domain information. For example, in a scenario of partial reciprocity in the frequency domain (e.g., when a bandwidth of an SRS resource is smaller or outside of a bandwidth for which a base station is to determine CSI), a tag indicating that an SRS resource is to be used for the purpose of deriving the CSI on another bandwidth (e.g., within the active bandwidth part, a different bandwidth part, a different component carrier of the same frequency band, a different component carrier of a different frequency band, and/or the like) may allow the UE to adjust a transmission of the SRS (e.g., precoding, path-loss, a spatial transmit beam) to align with channel conditions on that other bandwidth. Here, the association of the SRS resource with the other bandwidth for which the SRS is to be used for CSI derivation may be implicit or explicit.

In general, a frequency domain correlation may exist between antenna ports at a UE and antenna ports at a base station. For each antenna port pair (e.g., each Rx and Tx antenna port pair), a frequency domain channel response across $N_{SC}$ particular frequency ranges (e.g., subcarriers, groups of subcarriers, physical resource blocks (PRBs) groups of PRBs, sub-bands, and/or the like) can be denoted as $y_{r,p}(t)$ (where $y_{r,p}(t)=[h_1(t), \ldots h_{N_{sc}}(t)]^T$). A frequency domain correlation matrix of a given Rx antenna port r and a given Tx antenna port p may be denoted as:

$$R_{r,p} = E_t[y_{r,p}(t)y_{r,p}(t)^H] = \begin{bmatrix} E(|h_1|^2) & \cdots & E(h_1 h_{N_{sc}}^H) \\ \vdots & E(h_i h_j^H) & \vdots \\ E(h_{N_{sc}} h_1^H) & \cdots & E(|h_{N_{sc}}|^2) \end{bmatrix}$$

Some aspects described herein provide techniques and apparatuses for frequency domain correlation information that enables enhanced frequency domain partial reciprocity on the downlink. For example, in a TDD system when a UE transmits SRS on fewer than all component carriers of a frequency band, reporting of frequency domain correlation information may reduce or eliminate a need for SRS carrier switching that would otherwise be needed in order to obtain CSI in another component carrier. Therefore, a need for RF retuning is reduced or eliminated and, as a result, time and resources consumed in association with performing SRS carrier switching are reduced. The aspects described herein are also applicable to an FDD system. In an FDD system, reporting of frequency domain correlation information removes a need to transmit channel state information reference signal (CSI-RS), thereby reducing downlink overhead.

Notably, partial reciprocity may also exist in the spatial domain. For example, a UE with X (X>1) antennas may not be capable of sounding on all X antennas on the uplink, but may be capable of sending SRS on a subset of the X antennas. In such a case, knowledge of an antenna correlation may enable a base station to use a received channel of the sounded subset of the X antennas to derive a precoder on the downlink for all of the antennas. Here, the UE may provide antenna correlation parameters to the base station, along with a model assumption associated with deriving the precoder. For example, antenna correlation between a given pair of antennas i and j can be defined as $r_{ij}$ (where $r_{ij} = \alpha^{(d_{ij})^2}$). In this example, the UE may transmit SRS from a subset of the X antennas, and may also provide average cross-correlations of the other antennas. As a particular example, a UE may have four antennas—antenna 0, antenna 1, antenna 2, and antenna 3—and antennas 0 and 1 may be used for reception and transmission (i.e., antennas 0 and 1 may selectively operate as Tx antennas and Rx antennas), while antennas 2 and 3 antennas are used for reception only (i.e., antennas 2 and 3 may operate only as Rx antennas). In this example, the UE may transmit SRS on antennas 0 and 1, and may also provide six spatial correlation parameters—$r_{01}$, $r_{02}$, $r_{03}$, $r_{12}$, $r_{13}$, and $r_{23}$—each of which indicates a spatial correlation between an indicated pair of antennas. These spatial correlation parameters may then be used by a base station, in conjunction with a received channel of antennas 0 and 1, to derive a precoder on the downlink for all four Rx antennas of the UE. In some aspects, as described below, frequency domain correlation information may be used to translate a measurement to an unsounded antenna. For example, frequency domain correlation information may be used to translate a measurement from a first bandwidth to a second bandwidth for sounded antennas, and then spatial correlation information may be used to translate the measurement for the second bandwidth of the unsounded antennas.

FIGS. 3A-3G are diagrams associated with frequency domain correlation feedback for enhanced frequency domain partial reciprocity downlink, in accordance with various aspects of the present disclosure.

Figure 3A:
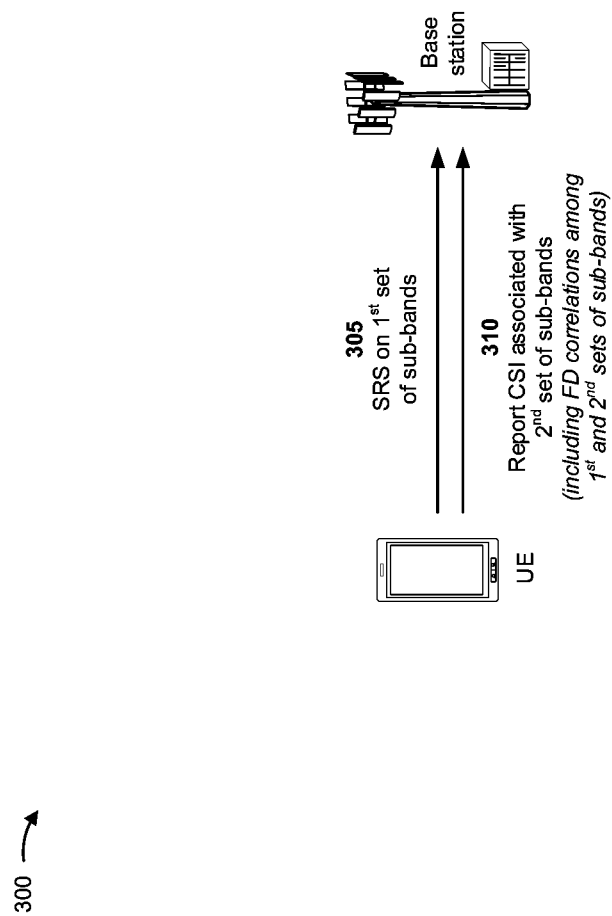
FIGS. 3A-3G are diagrams illustrating examples associated with frequency domain correlation feedback for enhanced frequency domain partial reciprocity downlink, in accordance with various aspects of the present disclosure.

As shown in FIG. 3A, by reference 305, a UE (e.g., UE 120) may transmit an SRS on a first set of sub-bands. That is, the UE may be configured, activated, or triggered (e.g., automatically, based on an indication from a base station) to transmit the SRS in one or more sub-bands of a frequency band, and may transmit the SRS accordingly. In some aspects, the SRS may be associated with downlink CSI acquisition or antenna switching, or may be associated with uplink CSI acquisition.

As shown by reference 310, the UE may report, to a base station (e.g., base station 110), CSI associated with a second set of sub-bands. In some aspects, the first set of sub-bands may be different from the second set of sub-bands. For example, the first set of sub-bands may not have any frequency overlap with the second sets of sub-bands. In some aspects, no SRS or CSI-RS is configured for the second set of sub-bands (which creates a requirement for using the SRS transmitted in the first set of sub-bands for CSI acquisition). In some aspects, the UE may report the CSI in a physical uplink shared channel (PUSCH). In some aspects, the UE may report the CSI in an information of variable size, such as uplink control information (UCI) Part 2.

As indicated in FIG. 3A, the CSI may include information that identifies one or more frequency domain correlations among the first set of sub-bands and the second set of sub-bands. That is, the CSI may include information that identifies a frequency domain correlation (e.g., a frequency domain correlation matrix) between the second set of sub-bands and a channel that is sounded through the SRS transmitted in the first set of sub-bands.

In some aspects, the UE may report the CSI in accordance with a CSI reporting configuration received by the UE. The CSI reporting configuration may include, for example, information that identifies the first set of sub-bands, information that identifies the second set of sub-bands, information associating the SRS with the second set of sub-bands, an indication to report the one or more frequency domain correlations, and/or the like. In some aspects, the CSI reporting configuration may include information indicating a manner in which the UE is to report the one or more frequency domain correlations. For example, the CSI reporting configuration may include information indicating whether the UE is to report normalized frequency domain correlations, information indicating a granularity of the frequency domain correlations to be reported (e.g., whether the one or more frequency domain correlations are to be reported in terms of subcarriers, groups of subcarriers, PRBs, groups of PRBs, sub-bands, and/or the like), or another type of reporting parameter. In some aspects, the UE may receive the CSI reporting configuration from the base station, and may report the CSI according to the CSI reporting configuration.

In some aspects, the UE may determine a given frequency domain correlation, of the one or more frequency domain correlations, based at least in part on averaging frequency domain correlations over a period of time. That is, in some aspects, the UE may determine the given frequency domain correlation by taking an average across a period of time (e.g., a specified, predetermined, or configured time-interval) of the inner product of two channels. Alternatively, in some aspects, the UE may determine a given frequency domain correlation based at least in part on a single frequency domain correlation determined at a particular time. That is, in some aspects, the UE may perform one-shot reporting of the given frequency domain correlation. In some aspects, the manner in which the UE determines a given frequency domain correlation may be indicated by the CSI reporting configuration.

In some aspects, the one or more frequency domain correlations may include one or more normalized frequency domain correlations. In some aspects, based on the description of the frequency domain correlation matrix described above, a given normalized frequency domain correlation can be determined as follows:

$$\frac{E(h_1 h_{N_{sc}}^H)}{\sqrt{E(|h_1|^2)} \cdot \sqrt{E(|h_{N_{sc}}|^2)}}$$

In some aspects, whether the UE is to determine and report normalized frequency domain correlations may be indicated by the CSI reporting configuration.

In some aspects, the UE may determine a given frequency domain correlation based at least in part on a signal previously received by the UE, such as a physical downlink shared channel (PDSCH) received on the first set of sub-bands, a PDSCH received on the second set of sub-bands, and/or another type of signal.

In some aspects, the UE may determine a given frequency domain correlation based at least in part on a physical relationship between one or more components a radio frequency (RF) chain associated with the first set of sub-bands and one or more components of a RF chain associated with the second set of sub-bands. In some aspects, the RF chain may include an amplifier, a filter, an antenna, and/or, one or more other components.

In some aspects, the UE may determine a given frequency domain correlation based at least in part on differences between one or more characteristics of a first signal and one or more characteristics of a second signal. For example, a first RF receive chain (e.g., including a first antenna, a first filter, and a first amplifier) of the UE may process a first signal received on the first set of sub-bands, and a second RF receive chain (e.g., including a second antenna, a second filter, and a second amplifier) of the UE may process a second signal received on the second set of sub-bands. Here, the UE may determine a difference between one or more characteristics of the received first and second signals, and may determine a frequency domain correlation associated with the first and second sets of sub-bands based at least in part on the difference. As another example, a first RF transmit chain (e.g., including a first amplifier, a first filter, and a first antenna) of the UE may process a first signal transmitted on the first set of sub-bands, and a second RF transmit chain (e.g., including a second amplifier, a second filter, and a second antenna) of the UE may process a second signal transmitted on the second set of sub-bands. Here, the UE may determine a difference between one or more characteristics of the transmitted first and second signals, and may determine a frequency domain correlation associated with the first and second sets of sub-bands based at least in part on the difference. In some aspects, the one or more signal characteristics (e.g., amplitude, phase, and/or the like) may differ among RF chains (e.g., RF receive chains, RF transmit chains) due to impedance matching being better on one RF chain than the other RF chain, thereby enabling the UE to identify such differences in signal characteristics for the purpose of determining frequency domain correlations.

In some aspects, the one or more characteristics may include, for example, an amplitude, a phase, and/or another signal characteristic. Therefore, in some aspects, a given frequency domain correlation, of the one or more frequency domain correlation may include an amplitude component and/or may include a phase component.

In some aspects, the one or more frequency domain correlations may be reported in terms of subcarriers, groups of subcarriers, PRBs, groups of PRBs, or sub-bands, as configured via the CSI reporting configuration in the manner described above.

In some aspects, the UE may, in addition the CSI, report a channel quality indicator (CQI) associated with the second set of sub-bands, or a rank indicator (RI) associated with the second set of sub-bands (despite there being no CSI-RS configured for the second set of sub-bands).

Figure 3B:
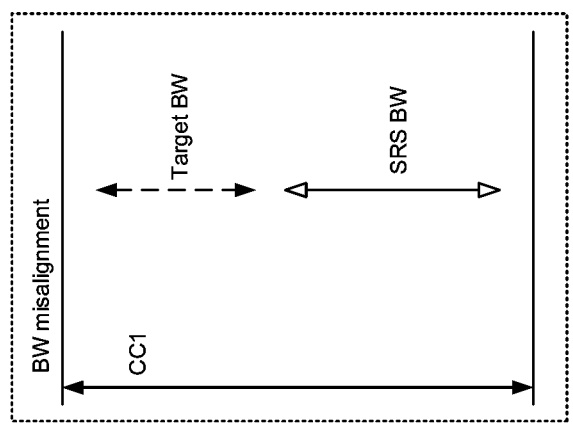

In some aspects, the first set of sub-bands and the second set of sub-bands may be in the same component carrier of a frequency band. FIG. 3B is a diagram illustrating an example in which the first set of sub-bands includes a single sub-band (identified as SRS BW) and the second set of sub-bands includes a single sub-band (identified as target BW), where the first and second sets of sub-bands are in a same component carrier (identified as CC1).

Figure 3C:
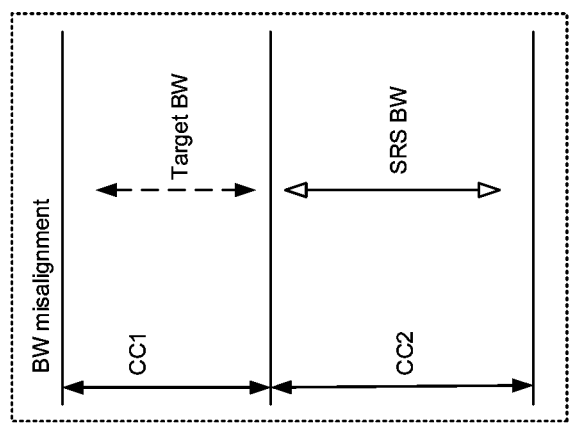

In some aspects, the first set of sub-bands and the second set of sub-bands may be in different component carriers of a frequency band. FIG. 3C is a diagram illustrating an example in which the first set of sub-bands includes a single sub-band (identified as SRS BW) and the second set of sub-bands includes a single sub-band (identified as target BW), where the first and second sets of sub-bands are in different component carriers (identified as CC1 and CC2, respectively).

Figure 3D:
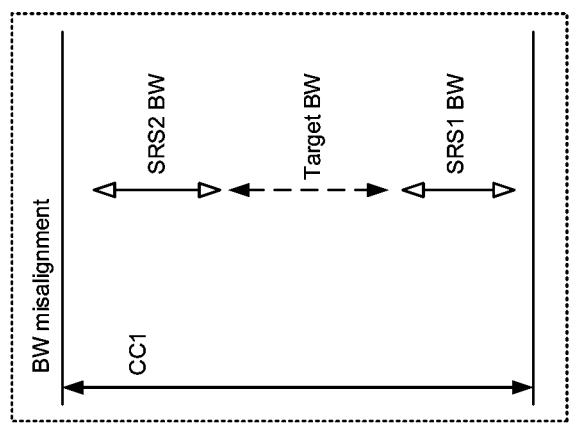

In some aspects, the UE may transmit multiple SRS in the first set of sub-bands. For example, in some aspects, the UE may transmit a first SRS transmitted on a first sub-band of the first set of sub-bands, and may transmit a second SRS on a second sub-band of the first set of sub-bands. Here, the one or more frequency domain correlations reported by the UE may include a frequency domain correlation between the first sub-band and the second set of sub-bands and a frequency domain correlation between the second sub-band and the second set of sub-bands. In this way, there may be multiple SRS associated with a given CSI report. In such a case, the UE may be configured (e.g., via the CSI reporting configuration) to report the frequency domain correlation between the first sub-band and the second set of sub-bands and the frequency domain correlation between the second sub-band and the second set of sub-bands via separate frequency domain correlations, or via a single frequency domain correlation. That is, the UE may report the correlation of the second set of sub-bands with respect to the first and second sub-bands separately, or may report one correlation for both the first and second sub-bands. FIG. 3D is a diagram illustrating an example associated with transmitting multiple SRS (identified as SRS1 and SRS2) on first and second sub-bands of the first set of sub-bands (identified as SRS1 BW and SRS2 BW, respectively). Notably, in FIG. 3D, the first set of sub-bands is shown as a non-contiguous set of sub-bands for illustrative purposes.

Figure 3E:
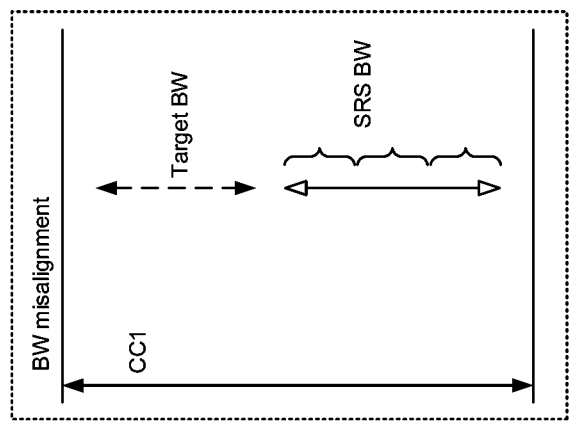

In some aspects, the first set of sub-bands may include multiple SRS sub-bands and the second set of sub-bands may include a single target sub-band. Here, the one or more frequency domain correlations reported by the UE may include a first frequency domain correlation between a first SRS sub-band and the single target sub-band, a second frequency domain correlation between a second SRS sub-band and the single target sub-band, and so on. That is, in some aspects, the UE may be configured to report multiple frequency domain correlations across different portions of a sounded SRS with respect to a target bandwidth. In such a case, a sub-band size of the frequency domain correlation matrix reporting needs to be defined. In some aspects, the sub-band size (e.g., associated with the first frequency domain correlation and the second frequency domain correlation) may be configured via a CSI reporting configuration. FIG. 3E is a diagram illustrating an example in which the first set of sub-bands includes multiple SRS sub-bands and the second set of sub-bands includes a single target sub-band.

Figure 3F:
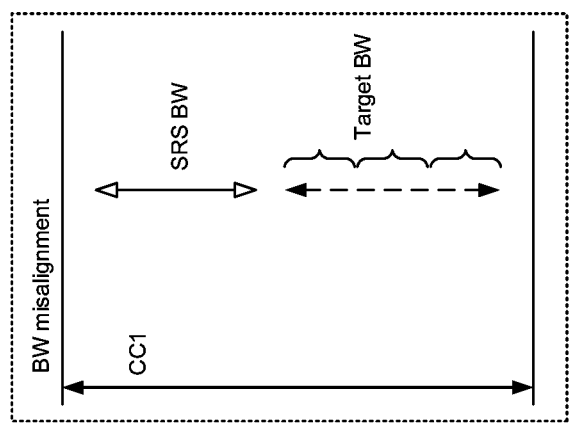

In some aspects, the first set of sub-bands may include a single SRS sub-band and the second set of sub-bands may include multiple target sub-bands. Here, the one or more frequency domain correlations reported by the UE may include a first frequency domain correlation between the single SRS sub-band and a first target sub-band, a second frequency domain correlation between the single SRS sub-band and a second target sub-band, and so on. FIG. 3F is a diagram illustrating an example in which the first set of sub-bands includes a single SRS sub-band and the second set of sub-bands includes multiple target sub-bands.

Figure 3G:
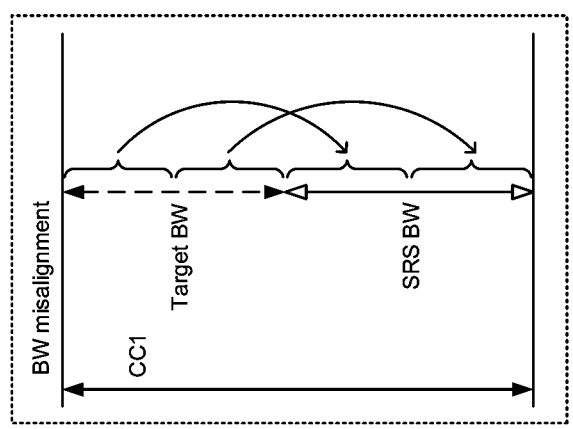

In some aspects, the first set of sub-bands may include multiple SRS sub-bands, and the second set of sub-bands may include multiple target sub-bands. Here, the one or more frequency domain correlations reported by the UE may include a first frequency domain correlation between a first SRS sub-band and a first target sub-band, a second frequency domain correlation between a second SRS sub-band and a second target sub-band, and so on. FIG. 3G is a diagram illustrating an example in which the first set of sub-bands includes multiple SRS sub-bands and the second set of sub-bands includes multiple target sub-bands.

In some aspects, when the UE reports multiple frequency domain correlation matrices (e.g., such as when the first set of sub-bands includes multiple SRS sub-bands and the second set of sub-bands includes multiple target sub-bands), the UE may report frequency domain correlations in a particular order. For example, the UE may first report frequency domain correlation matrices of even numbered sub-bands, and then report frequency domain correlation matrices of odd numbered sub-bands.

In some aspects, the UE may determine and report the one or more frequency domain correlations on a per-port basis. That is, in some aspects, the UE may report the frequency domain correlation matrix for each sounded SRS port i between the frequency domain channel at the SRS bandwidth and the frequency domain channel at the target bandwidth. In some aspects, this per-port reporting can enable translation of a measurement to an unsounded antenna. For example, if the UE sounds a subset of X antennas (e.g., two antennas out of four antennas), but receives in the downlink with all of the X antennas, the UE may also report a spatial correlation matrix between the sounded antennas and the unsounded antennas. In such a case, the base station can receive the sounded ports in the SRS bandwidth, use the frequency domain correlation to translate the measurements to the target bandwidth for the sounded antennas, and then use the spatial correlation to translate the measurements for the target bandwidth of the unsounded antennas.

In some aspects, the base station may measure a channel at the first set of sub-bands (e.g., at the SRS bandwidth) and, using the reported frequency domain correlations, may determine frequency domain information for the second set of sub-bands (e.g., the target bandwidth). In this way, frequency domain correlation information may be used to enable enhanced frequency domain partial reciprocity.

As indicated above, FIGS. 3A-3G is provided as examples. Other examples may differ from what is described with respect to FIGS. 3A-3G.

Figure 4:
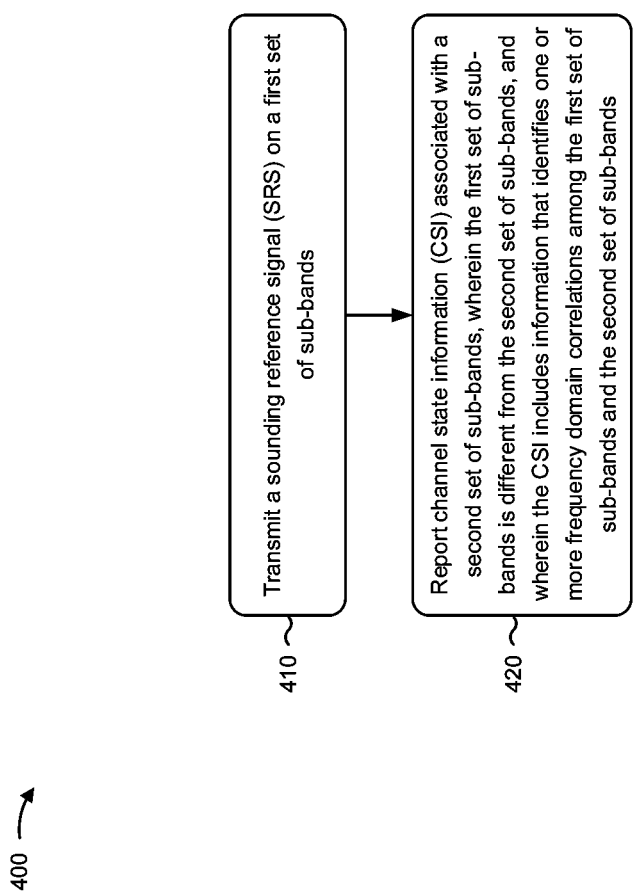
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations associated with frequency domain correlation feedback for enhanced frequency domain partial reciprocity downlink.

As shown in FIG. 4, in some aspects, process 400 may include transmitting an SRS on a first set of sub-bands (block 410). For example, the UE (e.g., using transmit processor 264, controller/processor 280, memory 282, and/or the like) may transmit an SRS on a first set of sub-bands, as described above.

As further shown in FIG. 4, in some aspects, process 400 may include reporting CSI associated with a second set of sub-bands, wherein the first set of sub-bands is different from the second set of sub-bands, and wherein the CSI includes information that identifies one or more frequency domain correlations among the first set of sub-bands and the second set of sub-bands (block 420). For example, the UE (e.g., using transmit processor 264, controller/processor 280, memory 282, and/or the like) may report CSI associated with a second set of sub-bands, as described above. In some aspects, the first set of sub-bands is different from the second set of sub-bands. In some aspects, the CSI includes information that identifies one or more frequency domain correlations among the first set of sub-bands and the second set of sub-bands.

Process 400 may include additional aspects, such as any single aspect or any combination of aspects described below and/or in connection with one or more other processes described elsewhere herein.

In a first aspect, process 400 includes receiving a CSI reporting configuration associated with reporting the CSI.

In a second aspect, alone or in combination with the first aspect, the CSI reporting configuration includes at least one of: information that identifies the first set of sub-bands, information that identifies the second set of sub-bands, information associating the SRS with the second set of sub-bands, an indication to report the one or more frequency domain correlations, or information indicating a manner in which to report the one or more frequency domain correlations.

In a third aspect, alone or in combination with one or more of the first and second aspects, no SRS or CSI reference signal is configured for the second set of sub-bands when the SRS is transmitted on the first set of sub-bands.

In a fourth aspect, alone or in combination with one or more of the first through third aspects, the SRS is associated with downlink CSI acquisition or antenna switching.

In a fifth aspect, alone or in combination with one or more of the first through fourth aspects, the SRS is associated with uplink CSI acquisition.

In a sixth aspect, alone or in combination with one or more of the first through fifth aspects, process 400 includes reporting at least one of: a channel quality indicator associated with the second set of sub-bands, or a rank indicator associated with the second set of sub-bands.

In a seventh aspect, alone or in combination with one or more of the first through sixth aspects, the one or more frequency domain correlations include one or more normalized frequency domain correlations.

In an eighth aspect, alone or in combination with one or more of the first through seventh aspects, the one or more frequency domain correlations are reported in terms of subcarriers, groups of subcarriers, PRBs, groups of PRBs, or sub-bands.

In a ninth aspect, alone or in combination with one or more of the first through eighth aspects, the UE may determine whether to report the one or more frequency domain correlations in terms of subcarriers, groups of subcarriers, PRBs, groups of PRBs, or sub-bands is configured based at least in part on a CSI reporting configuration.

In a tenth aspect, alone or in combination with one or more of the first through ninth aspects, the UE may determine a given frequency domain correlation, of the one or more frequency domain correlations, based at least in part on averaging two or more other frequency domain correlations over a period of time.

In an eleventh aspect, alone or in combination with one or more of the first through tenth aspects, the UE may determine a given frequency domain correlation, of the one or more frequency domain correlations, based at least in part on a single other frequency domain correlation determined at a particular time.

In a twelfth aspect, alone or in combination with one or more of the first through eleventh aspects, the first set of sub-bands is in a first component carrier of the frequency band and the second set of sub-bands is in a second component carrier of the frequency band that is different from the first component carrier.

In a thirteenth aspect, alone or in combination with one or more of the first through twelfth aspects, the SRS is a first SRS transmitted on a first sub-band of the first set of sub-bands, and process 400 further comprises transmitting a second SRS on a second sub-band of the first set of sub-bands, wherein the one or more frequency domain correlations include: a frequency domain correlation between the first sub-band and the second set of sub-bands, and a frequency domain correlation between the second sub-band and the second set of sub-bands.

In a fourteenth aspect, alone or in combination with one or more of the first through thirteenth aspects, the information that identifies the frequency domain correlation between the first sub-band and the second set of sub-bands and the information that identifies the frequency domain correlation between the second sub-band and the second set of sub-bands are reported via separate frequency domain correlations included in the CSI.

In a fifteenth aspect, alone or in combination with one or more of the first through fourteenth aspects, the information that identifies the frequency domain correlation between the first sub-band and the second set of sub-bands and the information that identifies the frequency domain correlation between the second sub-band and the second set of sub-bands are reported via a single frequency domain correlation included in the CSI.

In a sixteenth aspect, alone or in combination with one or more of the first through fifteenth aspects, the first set of sub-bands includes a first SRS sub-band and a second SRS sub-band, and the second set of sub-bands includes a single target sub-band, wherein the one or more frequency domain correlations include: a first frequency domain correlation between the first SRS sub-band and the single target sub-band, and a second frequency domain correlation between the second SRS sub-band and the single target sub-band.

In a seventeenth aspect, alone or in combination with one or more of the first through sixteenth aspects, the UE may determine a sub-band size associated with the first frequency domain correlation and the second frequency domain correlation based at least in part on a CSI reporting configuration.

In an eighteenth aspect, alone or in combination with one or more of the first through seventeenth aspects, the first set of sub-bands includes a single SRS sub-band, and the second set of sub-bands includes a first target sub-band and a second target sub-band, wherein the one or more frequency domain correlations include: a first frequency domain correlation between the single SRS sub-band and the first target sub-band, and a second frequency domain correlation between the single SRS sub-band and the second target sub-band.

In a nineteenth aspect, alone or in combination with one or more of the first through eighteenth aspects, the one or more frequency domain correlations are reported on a per-port basis.

In a twentieth aspect, alone or in combination with one or more of the first through nineteenth aspects, the CSI is reported in a physical uplink shared channel In a twenty-first aspect, alone or in combination with one or more of the first through twentieth aspects, the CSI is reported in uplink control information Part 2.

In a twenty-second aspect, alone or in combination with one or more of the first through twenty-first aspects, the first set of sub-bands includes a first SRS sub-band and a second SRS sub-band, and the second set of sub-bands includes a first target sub-band and a second target sub-band, wherein the one or more frequency domain correlations include: a first frequency domain correlation between the first SRS sub-band and the first target sub-band, and a second frequency domain correlation between the second SRS sub-band and the second target sub-band.

In a twenty-third aspect, alone or in combination with one or more of the first through twenty-second aspects, reporting the one or more frequency domain correlations may include reporting the first frequency domain correlation before reporting the second frequency domain correlation.

In a twenty-fourth aspect, alone or in combination with one or more of the first through twenty-third aspects, the UE may determine a frequency domain correlation, of the one or more frequency domain correlations, based at least in part on a signal previously received by the UE.

In a twenty-fifth aspect, alone or in combination with one or more of the first through twenty-fourth aspects, the signal previously received by the UE is a physical downlink shared channel.

In a twenty-sixth aspect, alone or in combination with one or more of the first through twenty-fifth aspects, the UE may determine a frequency domain correlation, of the one or more frequency domain correlations, based at least in part on a physical relationship between one or more components a first RF chain associated with the first set of sub-bands and one or more components of a second RF chain associated with the second set of sub-bands.

In a twenty-seventh aspect, alone or in combination with one or more of the first through twenty-sixth aspects, the UE may determine a frequency domain correlation, of the one or more frequency domain correlations, based at least in part on differences between one or more characteristics of a first signal and one or more characteristics of a second signal. Here, the first signal is processed by a first RF chain associated with the first set of sub-bands, and the second signal is processed by a second RF chain associated with the second set of sub-bands.

In a twenty-eighth aspect, alone or in combination with one or more of the first through twenty-seventh aspects, the first RF chain is an RF receive chain associated with receiving signals on the first set of sub-bands and the second RF chain is an RF receive chain associated with receiving signals on the second set of sub-bands.

In a twenty-ninth aspect, alone or in combination with one or more of the first through twenty-eighth aspects, the first RF chain is an RF transmit chain associated with transmitting signals on the first set of sub-bands and the second RF chain is an RF transmit chain associated with transmitting signals on the second set of sub-band.

In a thirtieth aspect, alone or in combination with one or more of the first through twenty-ninth aspects, the one or more characteristics of the first signal include an amplitude of the first signal and the one or more characteristics of the second signal include an amplitude of the second signal.

In a thirty-first aspect, alone or in combination with one or more of the first through thirtieth aspects, the one or more characteristics of the first signal include a phase of the first signal and the one or more characteristics of the second signal include a phase of the second signal.

In a thirty-second aspect, alone or in combination with one or more of the first through thirty-first aspects, a frequency domain correlation, of the one or more frequency domain correlations, includes an amplitude component.

In a thirty-third aspect, alone or in combination with one or more of the first through thirty-second aspects, a frequency domain correlation, of the one or more frequency domain correlations, includes a phase component.

In a thirty-fourth aspect, alone or in combination with one or more of the first through thirty-third aspects, a frequency domain correlation, of the one or more frequency domain correlations, describes a difference between an amplitude of a signal associated with the first set of sub-bands and an amplitude of a signal associated with the second set of sub-bands.

In a thirty-fifth aspect, alone or in combination with one or more of the first through thirty-fourth aspects, a frequency domain correlation, of the one or more frequency domain correlations, describes a difference between a phase of a signal associated with the first set of sub-bands and a phase of a signal associated with the second set of sub-bands.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    transmitting a sounding reference signal (SRS) on a first set of sub-bands;
    receiving a channel state information (CSI) reporting configuration associated with reporting the CSI; and
    reporting, based at least in part on the CSI reporting configuration, CSI associated with a second set of sub-bands,
        wherein the first set of sub-bands is different from the second set of sub-bands,
        wherein the CSI includes information that identifies one or more frequency domain correlations among the first set of sub-bands and the second set of sub-bands, and
        wherein the CSI reporting configuration includes at least one of:
            information that identifies the first set of sub-bands,
            information that identifies the second set of sub-bands,
            information associating the SRS with the second set of sub-bands,
            an indication to report the one or more frequency domain correlations, or
            information indicating a manner in which to report the one or more frequency domain correlations.

2. The method of claim 1, wherein a particular frequency domain correlation of the one or more frequency domain correlations is based at least in part on a signal previously received by the UE.

3. The method of claim 1, wherein a frequency domain correlation of the one or more frequency domain correlations includes an amplitude component.

4. The method of claim 1, wherein no SRS or CSI reference signal is configured for the second set of sub-bands when the SRS is transmitted on the first set of sub-bands.

5. The method of claim 1, wherein the SRS is associated with downlink CSI acquisition or antenna switching.

6. The method of claim 1, wherein the SRS is associated with uplink CSI acquisition.

7. The method of claim 1, further comprising:
    reporting at least one of:
        a channel quality indicator associated with the second set of sub-bands, or
        a rank indicator associated with the second set of sub-bands.

8. The method of claim 1, wherein the one or more frequency domain correlations include one or more normalized frequency domain correlations.

9. The method of claim 1, wherein a frequency domain correlation of the one or more frequency domain correlations includes a phase component.

10. The method of claim 1, wherein a frequency domain correlation of the one or more frequency domain correlations indicates a difference between an amplitude of a signal associated with the first set of sub-bands and an amplitude of a signal associated with the second set of sub-bands.

11. The method of claim 1, wherein the first set of sub-bands is in a first component carrier of a frequency band and the second set of sub-bands is in a second component carrier of the frequency band that is different from the first component carrier.

12. The method of claim 1, wherein a frequency domain correlation, of the one or more frequency domain correlations indicates a difference between a phase of a signal associated with the first set of sub-bands and a phase of a signal associated with the second set of sub-bands.

13. The method of claim 1, wherein the CSI reporting configuration includes:
the information that identifies the first set of sub-bands,
the information that identifies the second set of sub-bands,
the information associating the SRS with the second set of sub-bands,
the indication to report the one or more frequency domain correlations, and
the information indicating the manner in which to report the one or more frequency domain correlations.

14. The method of claim 1, wherein the CSI reporting configuration includes:
the information that identifies the first set of sub-bands, and
the information that identifies the second set of sub-bands.

15. The method of claim 1, wherein the CSI reporting configuration includes the information associating the SRS with the second set of sub-bands.

16. The method of claim 1, wherein the CSI reporting configuration includes the indication to report the one or more frequency domain correlations.

17. The method of claim 1, wherein the CSI reporting configuration includes the information indicating the manner in which to report the one or more frequency domain correlations.

18. The method of claim 1, wherein the one or more frequency domain correlations are reported on a per-port basis.

19. The method of claim 1, wherein the CSI is reported in a physical uplink shared channel.

20. The method of claim 1, wherein the CSI is reported in uplink control information Part 2.

21. A method of wireless communication performed by a user equipment (UE), comprising:
transmitting a sounding reference signal (SRS) on a first set of sub-bands; and
reporting channel state information (CSI) associated with a second set of sub-bands,
wherein the first set of sub-bands is different from the second set of sub-bands,
wherein the CSI includes information that identifies one or more frequency domain correlations among the first set of sub-bands and the second set of sub-bands,
wherein the first set of sub-bands includes a first SRS sub-band and a second SRS sub-band,
wherein the second set of sub-bands includes a first target sub-band and a second target sub-band, and
wherein the one or more frequency domain correlations include:
a first frequency domain correlation between the first SRS sub-band and the first target sub-band, and
a second frequency domain correlation between the second SRS sub-band and the second target sub-band.

22. The method of claim 21, wherein reporting the CSI comprises:
reporting the first frequency domain correlation before reporting the second frequency domain correlation.

23. The method of claim 21, wherein no SRS or CSI reference signal is configured for the second set of sub-bands when the SRS is transmitted on the first set of sub-bands.

24. The method of claim 21, wherein the first set of sub-bands is in a first component carrier of a frequency band and the second set of sub-bands is in a second component carrier of the frequency band that is different from the first component carrier.

25. The method of claim 21, wherein the one or more frequency domain correlations are reported on a per-port basis.

26. A method of wireless communication performed by a user equipment (UE), comprising:
transmitting a sounding reference signal (SRS) on a first set of sub-bands; and
reporting channel state information (CSI) associated with a second set of sub-bands,
wherein the first set of sub-bands is different from the second set of sub-bands,
wherein the CSI includes information that identifies one or more frequency domain correlations among the first set of sub-bands and the second set of sub-bands,
wherein a particular frequency domain correlation of the one or more frequency domain correlations is based at least in part on one or more differences between one or more characteristics of a first signal and one or more characteristics of a second signal,
wherein the first signal is processed by a first radio frequency (RF) chain associated with the first set of sub-bands, and
wherein the second signal is processed by a second RF chain associated with the second set of sub-bands.

27. The method of claim 26, wherein no SRS or CSI reference signal is configured for the second set of sub-bands when the SRS is transmitted on the first set of sub-bands.

28. The method of claim 26, wherein the first set of sub-bands is in a first component carrier of a frequency band and the second set of sub-bands is in a second component carrier of the frequency band that is different from the first component carrier.

29. The method of claim 26, wherein the one or more frequency domain correlations are reported on a per-port basis.

30. The method of claim 26, wherein the first RF chain is an RF receive chain associated with receiving signals on the first set of sub-bands and the second RF chain is an RF receive chain associated with receiving signals on the second set of sub-bands.

31. The method of claim 26, wherein the first RF chain is an RF transmit chain associated with transmitting signals on the first set of sub-bands and the second RF chain is an RF transmit chain associated with transmitting signals on the second set of sub-bands.

32. The method of claim 26, wherein the one or more characteristics of the first signal include an amplitude of the first signal and the one or more characteristics of the second signal include an amplitude of the second signal.

33. The method of claim 26, wherein the one or more characteristics of the first signal include a phase of the first signal and the one or more characteristics of the second signal include a phase of the second signal.

34. A method of wireless communication performed by a user equipment (UE), comprising:
    transmitting a sounding reference signal (SRS) on a first set of sub-bands; and
    reporting channel state information (CSI) associated with a second set of sub-bands,
        wherein the first set of sub-bands is different from the second set of sub-bands,
        wherein the CSI includes information that identifies one or more frequency domain correlations among the first set of sub-bands and the second set of sub-bands, and
        wherein a particular frequency domain correlation of the one or more frequency domain correlations is based at least in part on an average of two or more other frequency domain correlations over a period of time.

35. The method of claim 34, wherein no SRS or CSI reference signal is configured for the second set of sub-bands when the SRS is transmitted on the first set of sub-bands.

36. The method of claim 34, wherein the first set of sub-bands is in a first component carrier of a frequency band and the second set of sub-bands is in a second component carrier of the frequency band that is different from the first component carrier.

37. The method of claim 34, wherein the one or more frequency domain correlations are reported on a per-port basis.

38. A method of wireless communication performed by a user equipment (UE), comprising:
    transmitting a sounding reference signal (SRS) on a first set of sub-bands; and
    reporting channel state information (CSI) associated with a second set of sub-bands,
        wherein the first set of sub-bands is different from the second set of sub-bands,
        wherein the CSI includes information that identifies one or more frequency
    domain correlations among the first set of sub-bands and the second set of sub-bands, and
        wherein a particular frequency domain correlation of the one or more frequency domain correlations is based at least in part on a single other frequency domain correlation.

39. The method of claim 38, wherein no SRS or CSI reference signal is configured for the second set of sub-bands when the SRS is transmitted on the first set of sub-bands.

40. The method of claim 38, wherein the first set of sub-bands is in a first component carrier of a frequency band and the second set of sub-bands is in a second component carrier of the frequency band that is different from the first component carrier.

41. The method of claim 38, wherein the one or more frequency domain correlations are reported on a per-port basis.

42. A method of wireless communication performed by a user equipment (UE), comprising:
    transmitting a first sounding reference signal (SRS) on a first sub-band of a first set of sub-bands;
    transmitting a second SRS on a second sub-band of the first set of sub-bands; and
    reporting channel state information (CSI) associated with a second set of sub-bands,
        wherein the first set of sub-bands is different from the second set of sub-bands,
        wherein the CSI includes information that identifies one or more frequency
    domain correlations among the first set of sub-bands and the second set of sub-bands, and
        wherein the one or more frequency domain correlations include:
            a frequency domain correlation between the first sub-band and the second set of sub-bands, and
            a frequency domain correlation between the second sub-band and the second set of sub-bands.

43. A method of wireless communication performed by a user equipment (UE), comprising:
    transmitting a sounding reference signal (SRS) on a first set of sub-bands; and
    reporting channel state information (CSI) associated with a second set of sub-bands,
        wherein the first set of sub-bands is different from the second set of sub-bands,
        wherein the CSI includes information that identifies one or more frequency domain correlations among the first set of sub-bands and the second set of sub-bands,
        wherein the first set of sub-bands includes a first SRS sub-band and a second SRS sub-band,
        wherein the second set of sub-bands includes a single target sub-band, and wherein the one or more frequency domain correlations include:
            a first frequency domain correlation between the first SRS sub-band and the single target sub-band, and
            a second frequency domain correlation between the second SRS sub-band and the single target sub-band.

44. The method of claim 43, further comprising:
    determining a sub-band size associated with the first frequency domain correlation and the second frequency domain correlation based at least in part on a CSI reporting configuration.

45. The method of claim 43, wherein no SRS or CSI reference signal is configured for the second set of sub-bands when the SRS is transmitted on the first set of sub-bands.

46. The method of claim 43, wherein the first set of sub-bands is in a first component carrier of a frequency band and the second set of sub-bands is in a second component carrier of the frequency band that is different from the first component carrier.

47. The method of claim 43, wherein the one or more frequency domain correlations are reported on a per-port basis.

48. A method of wireless communication performed by a user equipment (UE), comprising:
    transmitting a sounding reference signal (SRS) on a first set of sub-bands; and reporting channel state information (CSI) associated with a second set of sub-bands,
  wherein the first set of sub-bands is different from the second set of sub-bands,
  wherein the CSI includes information that identifies one or more frequency domain correlations among the first set of sub-bands and the second set of sub-bands,
  wherein the first set of sub-bands includes a single SRS sub-band,
  wherein the second set of sub-bands includes a first target sub-band and a second target sub-band, and
  wherein the one or more frequency domain correlations include:
    a first frequency domain correlation between the single SRS sub-band and the first target sub-band, and
    a second frequency domain correlation between the single SRS sub-band and the second target sub-band.

49. The method of claim 48, wherein no SRS or CSI reference signal is configured for the second set of sub-bands when the SRS is transmitted on the first set of sub-bands.

50. The method of claim 48, wherein the first set of sub-bands is in a first component carrier of a frequency band and the second set of sub-bands is in a second component carrier of the frequency band that is different from the first component carrier.

51. The method of claim 48, wherein the one or more frequency domain correlations are reported on a per-port basis.

52. A method of wireless communication performed by a user equipment (UE), comprising:
  transmitting a sounding reference signal (SRS) on a first set of sub-bands; and
  reporting channel state information (CSI) associated with a second set of sub-bands,
    wherein the first set of sub-bands is different from the second set of sub-bands,
    wherein the CSI includes information that identifies one or more frequency domain correlations among the first set of sub-bands and the second set of sub-bands, and
    wherein a particular frequency domain correlation of the one or more frequency domain correlations is based at least in part on a physical relationship between one or more components a first radio frequency (RF) chain associated with the first set of sub-bands and one or more components of a second RF chain associated with the second set of sub-bands.

53. The method of claim 52, wherein no SRS or CSI reference signal is configured for the second set of sub-bands when the SRS is transmitted on the first set of sub-bands.

54. The method of claim 52, wherein the first set of sub-bands is in a first component carrier of a frequency band and the second set of sub-bands is in a second component carrier of the frequency band that is different from the first component carrier.

55. The method of claim 52, wherein the one or more frequency domain correlations are reported on a per-port basis.

* * * * *